United States Patent
Pozzi et al.

(10) Patent No.: US 9,919,803 B2
(45) Date of Patent: Mar. 20, 2018

(54) AIRCRAFT SEAT BASE FRAME

(71) Applicant: B/E AEROSPACE, INC., Wellington, FL (US)

(72) Inventors: Alexander Nicholas Pozzi, Winston-Salem, NC (US); Benjamin D. Stephens, Atlanta, GA (US); Mark A. Kruse, Atlanta, GA (US); Francis X. Garing, Atlanta, GA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 15/288,599

(22) Filed: Oct. 7, 2016

(65) Prior Publication Data

US 2017/0021933 A1 Jan. 26, 2017

Related U.S. Application Data

(63) Continuation-in-part of application No. 14/679,516, filed on Apr. 6, 2015, now Pat. No. 9,573,688.
(Continued)

(51) Int. Cl.
*A47C 7/72* (2006.01)
*B64D 11/06* (2006.01)
*B64D 11/00* (2006.01)

(52) U.S. Cl.
CPC ...... *B64D 11/0648* (2014.12); *B64D 11/0015* (2013.01); *B64D 11/064* (2014.12); *B64D 11/0631* (2014.12); *B64D 11/0636* (2014.12)

(58) Field of Classification Search
CPC ............ B64D 11/0631; B64D 11/0636; B64D 11/0648; B64D 11/0015
(Continued)

(56) References Cited

U.S. PATENT DOCUMENTS 3,603,638 A 9/1971 McGregor
3,623,683 A 11/1971 Bennett
(Continued)

FOREIGN PATENT DOCUMENTS

WO WO 2004/026688 A1 4/2004
WO WO 2013/109751 A1 7/2013

OTHER PUBLICATIONS

International Search Report and Written Opinion of corresponding International Application No. PCT/US2015/024513; 10 pages; dated Aug. 3, 2015.

*Primary Examiner* — Rodney B White
(74) *Attorney, Agent, or Firm* — Shumaker, Loop & Kendrick, LLP

(57) ABSTRACT

In a preferred embodiment, an aircraft passenger seat base frame can include spaced left and right spreaders supporting a seat pan and a seatback. Additionally, a front transverse structural member and a rear transverse structural member can each interconnect with the left and right spreaders. An in-flight entertainment component compartment defined in the seat pan at least in part by placement of the front transverse structural member and the rear transverse structural member can enclose an in-flight entertainment component, wherein the front transverse structural member is positioned for aligning in a vertical plane with at least a portion of the in-flight entertainment component, and the rear transverse structural member is positioned for aligning in a horizontal plane with at least a portion of the in-flight entertainment component.

18 Claims, 9 Drawing Sheets

Related U.S. Application Data

(60) Provisional application No. 61/975,144, filed on Apr. 4, 2014.

(58) Field of Classification Search
USPC .............. 297/188.01, 188.08, 188.09, 188.1, 297/188.11, 188.12, 188.13
See application file for complete search history.

(56) References Cited

U.S. PATENT DOCUMENTS

| | | |
|---|---|---|
| 4,229,040 A | 10/1980 | Howell |
| 4,489,978 A | 12/1984 | Brennan |
| 4,911,381 A | 3/1990 | Cannon |
| 5,183,313 A | 2/1993 | Cunningham |
| 5,409,186 A | 4/1995 | Chow |
| 5,485,976 A | 1/1996 | Creed |
| 5,553,923 A | 9/1996 | Bilezikjian |
| 5,657,950 A | 8/1997 | Han |
| 5,730,492 A | 3/1998 | Warrick |
| 7,077,467 B2 | 7/2006 | Wenzler |
| 7,252,569 B2 | 8/2007 | Everhart |
| 7,338,131 B2 | 3/2008 | Forgatsch |
| 7,517,014 B2 | 4/2009 | Schroeder |
| 7,976,101 B2 | 7/2011 | Wieland |
| 8,002,350 B2 | 8/2011 | Johnson |
| 8,128,163 B2 | 3/2012 | Alberti |
| 8,292,224 B1 | 10/2012 | Ahad |
| 8,616,631 B2 | 12/2013 | Westerink |
| 9,573,688 B2 * | 2/2017 | Pozzi ................. B64D 11/0631 |
| 2002/0175547 A1 | 11/2002 | Bentley |
| 2003/0054687 A1 | 3/2003 | Sanner et al. |
| 2003/0094837 A1 | 5/2003 | Williamson |
| 2003/0094838 A1 | 5/2003 | Williamson |
| 2003/0094840 A1 | 5/2003 | Williamson |
| 2003/0094842 A1 | 5/2003 | Williamson |
| 2004/0021349 A1 | 2/2004 | Longtin |
| 2004/0046430 A1 | 3/2004 | Plant |
| 2004/0066065 A1 | 4/2004 | Forstner |
| 2005/0062319 A1 | 3/2005 | Hough |
| 2006/0006704 A1 | 1/2006 | Skelly |
| 2006/0163917 A1 | 7/2006 | Schroeder |
| 2007/0228794 A1 | 10/2007 | Penley |
| 2008/0106127 A1 | 5/2008 | Hough |
| 2009/0058165 A1 | 3/2009 | Rombouts |
| 2009/0302665 A1 | 12/2009 | Dowty |
| 2012/0217779 A1 | 8/2012 | Gaither |
| 2014/0375090 A1 | 12/2014 | Wegenka |
| 2015/0284087 A1 | 10/2015 | Henshaw |
| 2016/0009398 A1 | 1/2016 | Klettke |
| 2016/0023769 A1 | 1/2016 | Zheng |

* cited by examiner

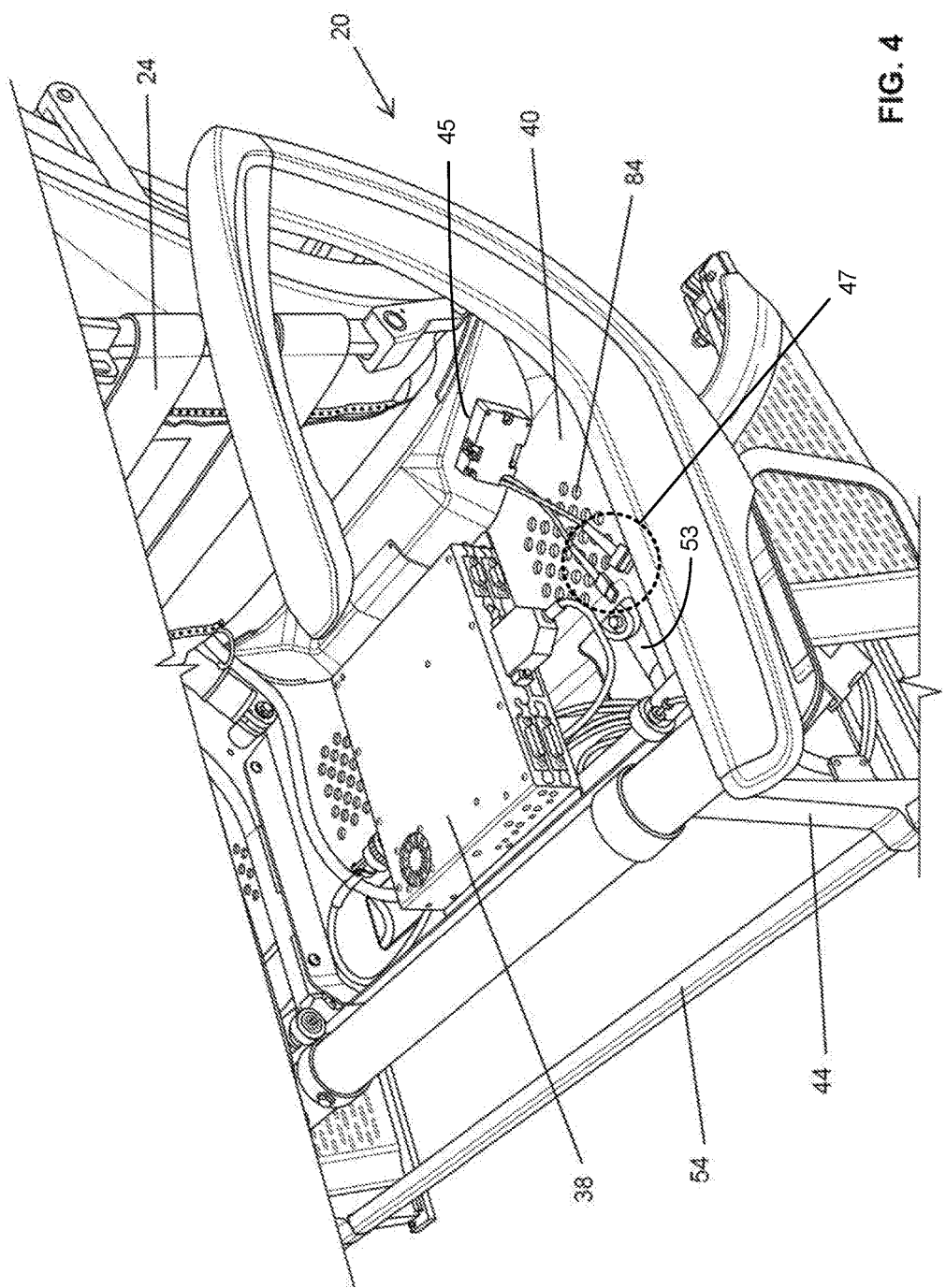

AIRCRAFT SEAT BASE FRAME

CROSS-REFERENCE TO RELATED APPLICATION

This application is a continuation-in-part of and claims priority from U.S. patent application Ser. No. 14/679,516 filed Apr. 6, 2015 and entitled "Aircraft Seat Base Frame", now U.S. Pat. No. 9,573,688 B2, which claims priority to U.S. Provisional Application No. 61/975,144 filed Apr. 4, 2014, the entirety of each of which is incorporated by reference herein.

BACKGROUND

Aircraft passenger seats are typically configured with in-flight entertainment ("IFE") equipment such as video, media, internet, communications and audio equipment for use during a flight. Such equipment often requires supporting hardware, cabling, wire harnesses, etc., referred to collectively herein as "IFE components". Because the area beneath the seat is typically reserved for legroom and luggage storage, particularly in economy seating classes, it has been necessary to locate WE components apart from the seats that they serve, resulting in long cable lengths, complexity and cost. Therefore, it would be desirable to configure a seat frame such that it is possible and practical to locate IFE components beneath the seats, without having to relocate life vest containers or consuming space reserved for passenger use. Further, it is desirable to design a seat frame which can provide protection to IFE components from loads and/or impacts.

SUMMARY OF ILLUSTRATIVE EMBODIMENTS

The present disclosure relates generally to an aircraft passenger seat frame arrangement, and more particularly, to a seat base frame layout for an aircraft passenger seat in which in-flight entertainment components are located over one of the front and rear structural members, allowing a life-vest container to be positioned below or in front in an area with low passenger space impact.

The foregoing paragraphs have been provided by way of general introduction, and are not intended to limit the scope of the following claims. The described embodiments, together with further advantages, will be best understood by reference to the following detailed description taken in conjunction with the accompanying drawings.

In a preferred embodiment, an aircraft passenger seat base frame can include spaced left and right spreaders supporting a seat pan and a seatback. Additionally, a front transverse structural member and a rear transverse structural member can each interconnect with the left and right spreaders. An in-flight entertainment component compartment defined in the seat pan at least in part by placement of the front transverse structural member and the rear transverse structural member can enclose an in-flight entertainment component, wherein the front transverse structural member is positioned for aligning in a vertical plane with at least a portion of the in-flight entertainment component, and the rear transverse structural member is positioned for aligning in a horizontal plane with at least a portion of the in-flight entertainment component.

In another embodiment, an aircraft passenger seating group can include first and second laterally-adjacent passenger seat frames, wherein each laterally-adjacent passenger seat frame can include spaced left and right spreaders supporting a seat pan and a seatback, a seat bottom, and a protective member disposed below the respective seat bottom of each laterally-adjacent passenger seat frame. The protective member is configured to retain an in-flight entertainment component, each protective member including a respective laterally-extending channel, wherein the laterally-extending channel of the protective member of the first laterally-adjacent passenger seat frame aligns with the laterally-extending channel of the protective member of the second laterally-adjacent passenger seat frame. Additionally, a front transverse structural member and a rear transverse structural member each can interconnect with the left and right spreaders, wherein one of the front transverse structural member and the rear transverse structural member is positioned below the in-flight entertainment component. The other of the front transverse structural member and the rear transverse structural member is positioned in a horizontal plane with the in-flight entertainment component, wherein in-flight entertainment signals are made available from an in-flight entertainment component retained by the protective member of the first laterally-adjacent passenger seat frame to the second laterally-adjacent passenger seat frame by arranging cabling from the in-flight entertainment component through the channel of the protective member of the first laterally-adjacent passenger seat frame to the channel of the protective member of the second laterally-adjacent passenger seat frame.

In another embodiment, an aircraft passenger seat base frame can include a seatback configured for actuation between a reclined position and an upright position and a seat pan configured for actuation between a fore position corresponding to the reclined position of the seatback and an aft position corresponding to the upright position of the seatback. Spaced left and right spreaders can support the seat pan and the seatback. An in-flight entertainment component can be positioned in the seat pan with a front transverse structural member and a rear transverse structural member each interconnecting the left and right spreaders, wherein one of the front transverse structural member and the rear transverse structural member is positioned below the in-flight entertainment component, and the other of the front transverse structural member and the rear transverse structural member is positioned in a horizontal plane with the in-flight entertainment component, wherein the in-flight entertainment component translates with actuation of the seat pan.

It is an object of the present disclosure to provide an aircraft passenger seat base frame configured to position an in-flight entertainment component in a position apart and protected from passenger living space and luggage retention.

In one aspect, the present disclosure relates to providing an aircraft passenger seat base frame in which the transverse structural members are arranged to defined space below the seat bottom for accommodating in-flight entertainment equipment and a life vest container. The aircraft passenger seat base frame may be configured to position a life vest container containing a life vest in a position proximate a forward end of the seat bottom for ready access and out of the way of passenger living space and luggage retention.

In one aspect, the present disclosure relates to providing space below an aircraft passenger seat bottom for positioning inflight entertainment equipment that serves a single seat, laterally adjacent seats, a row of laterally adjacent seats, longitudinally adjacent seats, or rows of longitudinally adjacent seats.

In one aspect, the present disclosure relates to providing an aircraft passenger seat base frame including particular transverse structural member arrangements defining protected and dedicated space beneath the seat bottom for housing in-flight entertainment equipment and/or a life vest container containing a life vest.

To achieve the foregoing and other embodiments, in one embodiment an aircraft passenger seat base frame includes spaced left and right spreaders supporting a seat bottom and a seatback, spaced front and rear transverse structural members interconnecting the left and right spreaders, the front structural member positioned proximate a forward end of the seat bottom and the rear structural member positioned proximate a rear end of the seat bottom and at a vertical height lower than the front structural member, an in-flight entertainment component positioned below the seat bottom in a space behind the front structural member and vertically above the rear structural member, and a life vest container positioned vertically below the front structural member.

In another aspect, the seat base frame may include spaced left and right leg assemblies each including a front leg and a rear leg adapted to be secured to a seat track by way of track fasteners.

In another aspect, each leg assembly may include a front leg that extends vertically between the front structural member and the seat track, and a rear leg that extends from vertically below the front structural member to a position on the seat track behind the rear structural member.

In another aspect, the seat base frame may include a protective member positioned vertically below the in-flight entertainment component.

In another aspect, the seat base frame may include a luggage retention bar positioned vertically below the life vest container.

In another aspect, the seat base frame may include a center spreader centered between the left and right spreaders, the center spreader shared by laterally adjacent passenger seats, and the front and rear transverse structural members spanning between the left and right spreaders and through the center spreader.

In another aspect, the in-flight entertainment component may include one or more of video equipment, media equipment, internet equipment, communications equipment, audio equipment, cabling, and a wire harness.

In another embodiment, an aircraft passenger seat base frame includes spaced left and right spreaders supporting a seat bottom and a seatback, spaced front and rear transverse structural members interconnecting the left and right spreaders, the front structural member positioned proximate a middle of the seat bottom and the rear structural member positioned proximate a rear end of the seat bottom and at a vertical height above the front structural member, an in-flight entertainment component positioned below the seat bottom in a space above the front structural member and forward of the rear structural member, and a life vest container positioned forward of the front structural member and vertically below the in-flight entertainment component.

In another aspect, the seat base frame may include left and right leg assemblies each including a front leg and a rear leg adapted to be secured to a seat track by way of track fasteners.

In another aspect, the front legs may extend at an angle to vertical from the front structural member to a position on the seat track forward of the front structural member, and the rear legs may curve from vertically below the rear structural member to a position on the seat track behind the rear structural member.

In another aspect, the seat base frame may include a protective member positioned between the in-flight entertainment components and the life vest container, the life vest container secured to the underside of the protective member.

In another aspect, the seat base frame may include a protective member positioned between the in-flight entertainment components and the life vest container, the life vest container secured to the underside of the protective member.

In another aspect, the seat base frame may include a luggage retention bar positioned vertically below the life vest container.

In another embodiment, an aircraft passenger seat base frame includes spaced left and right spreaders cooperatively supporting a seat bottom and a seatback, spaced front and rear transverse structural members interconnecting the left and right spreaders, spaced left and right leg assemblies each including a front leg and a rear leg, an in-flight entertainment component position in a space below the seat bottom, and a life vest container positioned below a front end of the seat bottom.

Embodiments can include one or more or any combination of the features and configurations described herein.

Additional features, aspects and advantages of various embodiments of aircraft seat base frames will be set forth in the detailed description which follows, and in part will be readily apparent to those skilled in the art from that description or recognized by practicing the teachings as described herein. It is to be understood that both the foregoing general description and the following detailed description present various illustrative embodiments, and are intended to provide an overview or framework for understanding the nature and character of the aircraft seat base frame as it is claimed. The accompanying drawings are included to provide a further understanding of the illustrative embodiments, and are incorporated in and constitute a part of this specification.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a perspective view of an example aircraft passenger seat base frame showing the location of the IFE components according to one or more aspects of the disclosed subject matter;

DETAILED DESCRIPTION OF ILLUSTRATIVE EMBODIMENTS

Figure 1:
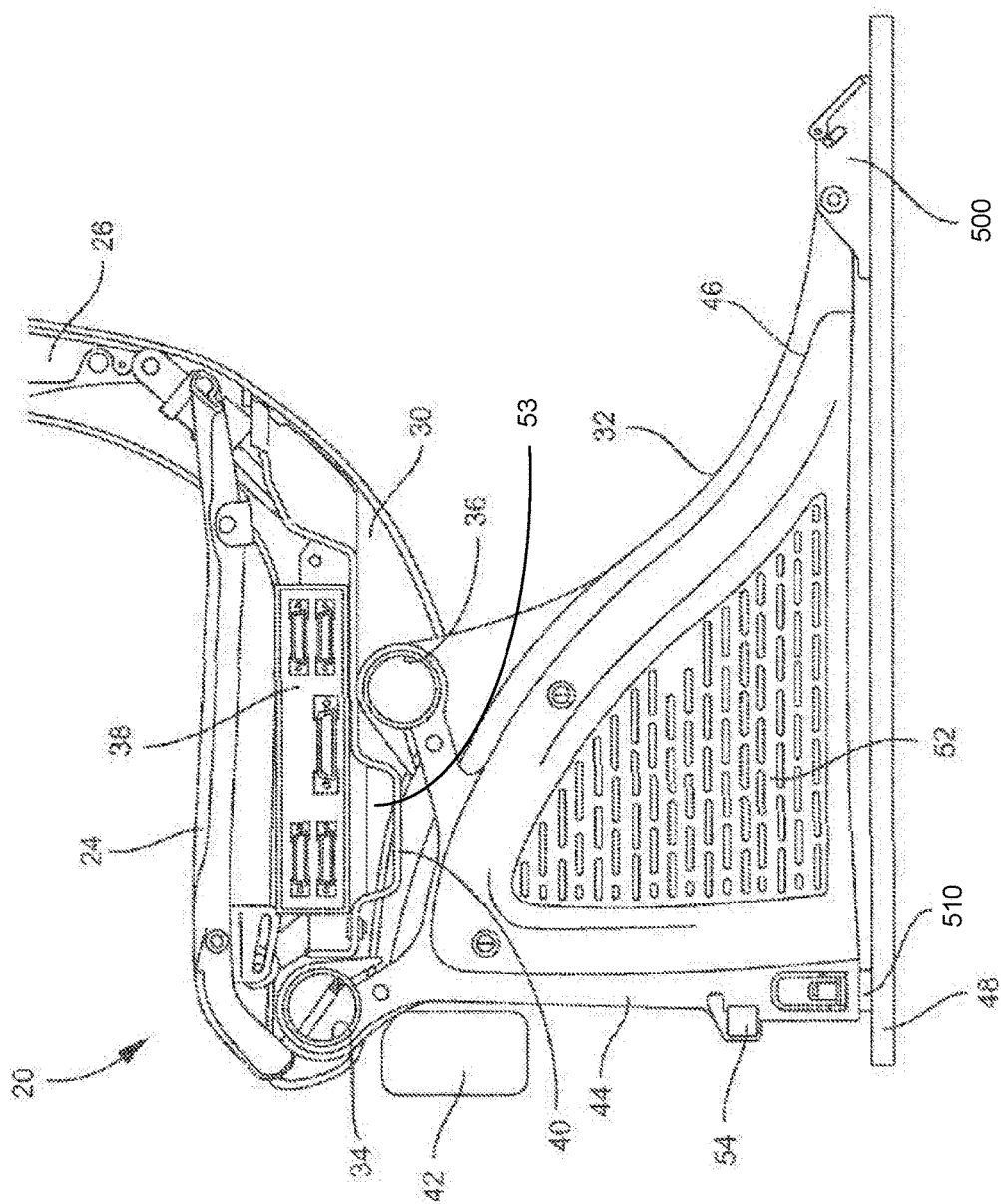
FIG. 1 is a side elevation view of an example aircraft passenger seat base frame according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, like reference numerals designate identical or corresponding parts throughout the several views.

Referring to FIG. 1, a first embodiment of an aircraft passenger seat base frame is shown generally at reference numeral 20. The seat base frame 20 may include a single seat, or two or more laterally adjacent seats collectively forming a seating group such as a row of seats. Each seat within the same row generally includes a seat bottom 24 and seatback 26 cooperatively supported on and between spaced left spreader 30 and right spreader 28 (see FIG. 2). The left and right spreaders 28, 30, positioned on opposite sides of the seat bottom 24, may be supported above the floor by spaced left and right leg assemblies 32. The left and right spreaders 28, 30 and leg assemblies 32 may be interconnected through front and rear transverse structural members 34, 36. In one aspect, each seat may also include a leg rest and/or one or more arm rests. The seat bottom 24 and/or seatback 26 may adjust to achieve upright and reclined sitting positions for taxi, takeoff and landing and comfort during flight, respectively. Seatback recline may be driven by seat bottom movement or independent thereof by way of pivotable attachment to the left and right spreaders 28, 30.

The left and right spreaders 28, 30 and front and rear structural members 34, 36, in some embodiments, are primary supportive frame members of the seat base frame 20, and, as such, are positioned to the respective sides and bottom of the seat bottom 24. The front transverse structural member or "front structural member" 34, for example, can be positioned vertically below the seat bottom 24 proximate the front end thereof. The rear transverse structural member or "rear structural member" 36 can be positioned proximate the back end of the seat bottom and a vertical height lower than the front structural member 34. In this structural member arrangement, a space is provided behind the front structural member 34 and above the rear structural member 36 for locating in-flight entertainment (WE) components shown generally at reference numeral 38. As illustrated, the WE components 38 are positioned vertically above the rear structural member 36. The seat base frame 20 may provide an exoskeleton to protect and encase the IFE components 38. WE components 38 may include video equipment, media equipment, internet equipment, communications equipment, audio equipment, cabling, and a wire harness.

Figure 7:
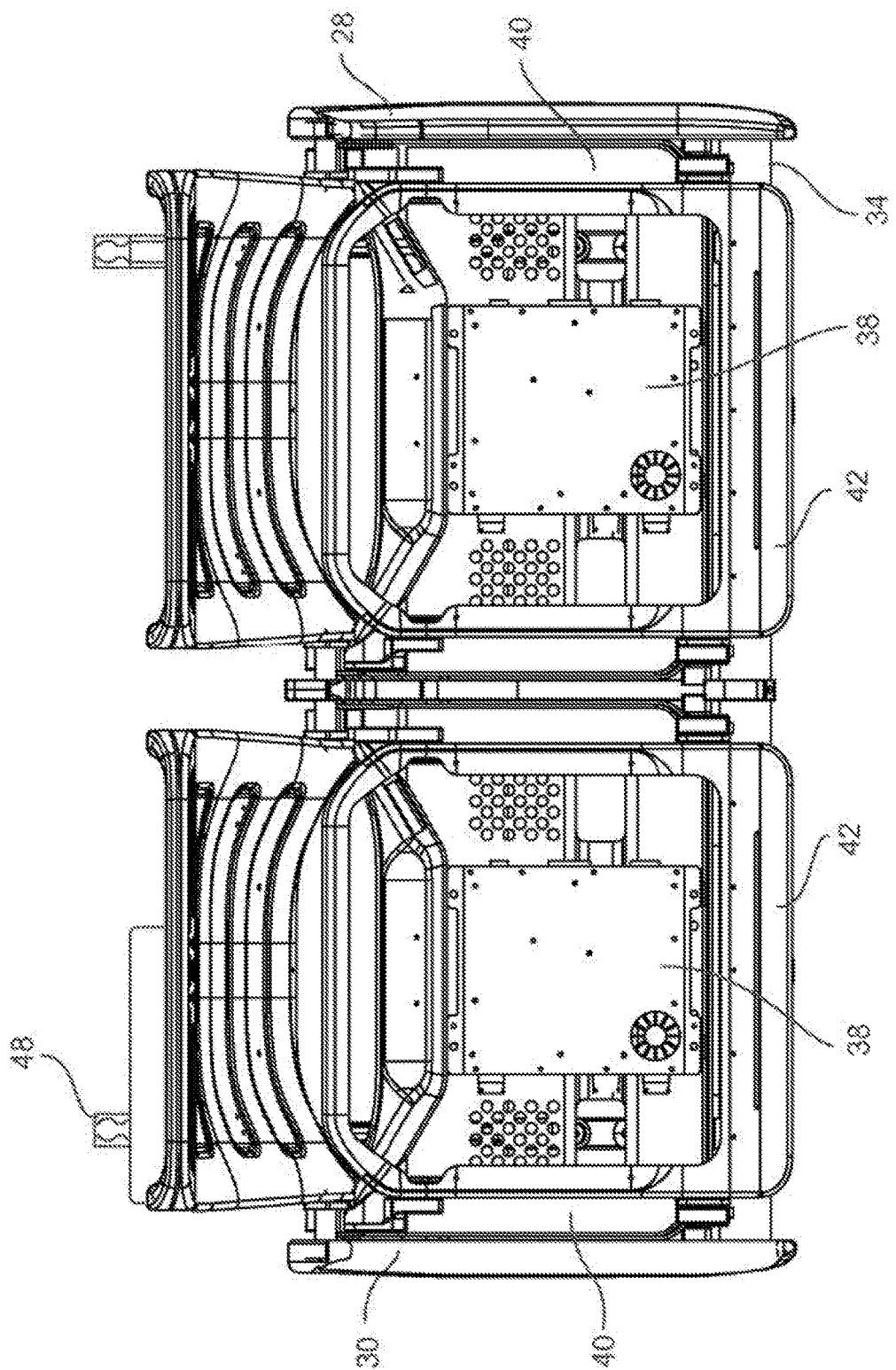
FIG. 7 is an aerial view of laterally adjacent aircraft passenger seat base frames within the same row sharing common frame elements according to one or more aspects of the disclosed subject matter.

FIG. 7 shows laterally adjacent passenger seats within the same row sharing common frame elements such as the front and rear structural members 34, 36, and a center spreader 56 centered between the left and right spreaders 28, 30. Each seat is shown having its own dedicated IFE components 38, although as discussed herein, IFE components located within one seat may serve additional seats.

The space dedicated for the IFE components 38, in some embodiments, is protected from the front by the front structural member 34, the top by the seat bottom 24, the rear by the rear and underside by structural member 36, and the back by the seatback 26. The dedicated space for the IFE components 38 may be spaced apart and protected from passenger living space and under seat space dedicated for luggage storage for an aft-seated passenger.

Additionally, in some implementations, a protective member 40 (e.g., shroud) is positioned at least beneath the IFE components 38 to further provide protection against damage. For example, the protective member 40 may be designed as an open-topped or close-topped box in which the IFE components 38 are situated. The protective member 40 may be secured to the left and right spreaders 28, 30 and/or the front and rear structural members 34, 36.

The protective member 40, in some embodiments, protects against impact loads, especially those applied due to passengers pushing their belongings under the seat bottom or extending their feet beneath the seat bottom. The IFE components 38, in one example, may be structurally supported (e.g., placed on a bottom of) the protective member 40. In another example, the IFE components 38 may be suspended within the protective member 40 (e.g., supported by support tabs, support beams, or other elements disposed within or through the protective member 40).

The protective member 40, in some embodiments, includes a number of openings to encourage air circulation around the IFE components 38. The air passing through the holes in protective member 40 can provide air flow and/or cooling to the IFE components 38. In another example, the protective member 40 may be a mesh. The protective member 40 may be designed using a variety of materials, including plastics and metals. In a particular example, the protective member 40 may be designed using an aluminum tray pierced throughout with rounded (e.g., circular or oval) openings, as illustrated in FIG. 4

Further, to encourage air flow, the protective member 40 may be dimensioned such that a gap between the seat bottom and the IFE components 38 exists. The gap, in some examples, may be between one quarter inch and two inches, or preferably about one inch in depth.

Accessing the IFE components 38 may require removing the seat bottom 24 or protective member 40 positioned immediately below the IFE components 38. In another aspect, the seat bottom 24 can be raised (operating like a hatch) as shown in FIG. 4 to access the IFE components 38 without removing the seat bottom 24. In FIG. 4, the seat bottom 24 is depicted in an open position such that the seat bottom 24 is raised to allow access to the IFE components 38 and any other components stored beneath the seat bottom 24. The seat bottom 24 can also be in a closed position in which the seat bottom 24 is lowered to provide a seat to passengers, as well as provide additional protection for the IFE components 38. As a result of the seat bottom 24 providing a hatch access, there is no need for a separate box or door, for example, to grant access to the IFE components 38.

The IFE components 38 may serve a single seat, laterally adjacent seats, all seats within the same row, longitudinally adjacent seats, longitudinally adjacent rows of seats, seats across the aisle from one another, etc. The protective member 40, in some implementations, includes IFE component attachment points and/or runs for routing associated cabling. For example, as illustrated in FIG. 1, a cable feed channel 53 disposed under a portion of the IFE equipment 38 allows electronics connections to be routed through a lowered channel portion of the protective member 40 from the IFE equipment 38 to additional passenger seats within a same passenger seat group. Further, the cable feed channel 53 may be positioned beneath a fan or cooling outlet for the IFE equipment 38, supplying greater air flow potential for cooling the IFE equipment 38. In one aspect, the cabling does not translate when the seat bottom 24 translates, and the seat bottom 24 can move above and independent of the cables. In another aspect, one or more of the cabling, seat bottom 24, IFE equipment 38, protective member 40, and the like can translate when the seat bottom 24 translates. The cabling, for example, may supply video, media, internet, and/or audio signals and feeds to headrest mounted monitors and audio connection components provided for aft-seated passengers. In another example, the cabling may supply video, media, internet, and/or audio signals and feeds to armrest-stowed (e.g., "swing-out") video monitors and other media equipment designated for the passenger seated within the passenger seat maintaining the IFE equipment 38 as well as, potentially, passengers in surrounding seats in a same seating group.

The front and rear structural member arrangement illustrated in FIGS. 1 and 6, in some embodiments, frees space forward of the rear structural member 36 and vertically below the front structural member 34 for locating a life vest container 42 containing a life vest to be used in an emergency situation. Positioning the life container 42 in this location, for example, allows quick and easy access for the passenger, while also positioning the life vest container apart from the luggage storage area beneath the seat bottom 24. The life vest container 42 may be a generally rectangular shaped container spanning a portion of the width of the seat bottom 24. The container may include a top flap, door or other opening for accessing the interior of the container to remove the life vest therefrom. The container 42 may be fixed to the seat base frame 20 or removably attached thereto so that the entire container 42 can be pulled from the seat and then opened. The location of the life vest container 42 has little or no passenger space impact.

Turning to FIG. 1, in some implementations, the left and right leg assemblies 32 each include a front leg 44 and a rear leg 46 configured to attach to an underlying seat track 48 in the floor by way of tool-less quick release track fasteners 500, 510. The front leg 44 as shown extends generally linearly and vertically between the front structural member 34 and the floor, while the rear leg 46 is curved and extends from vertically below the front structural member 34 to a position on the seat track 48 behind the rear structural member 36, and as shown, substantially rearward of the rear structural member. The space formed between the front and rear legs 44, 46, may be covered with a panel 52, for example, to divide footwells and/or to prevent luggage stowed beneath the seat from moving into the aisle.

Figure 3:
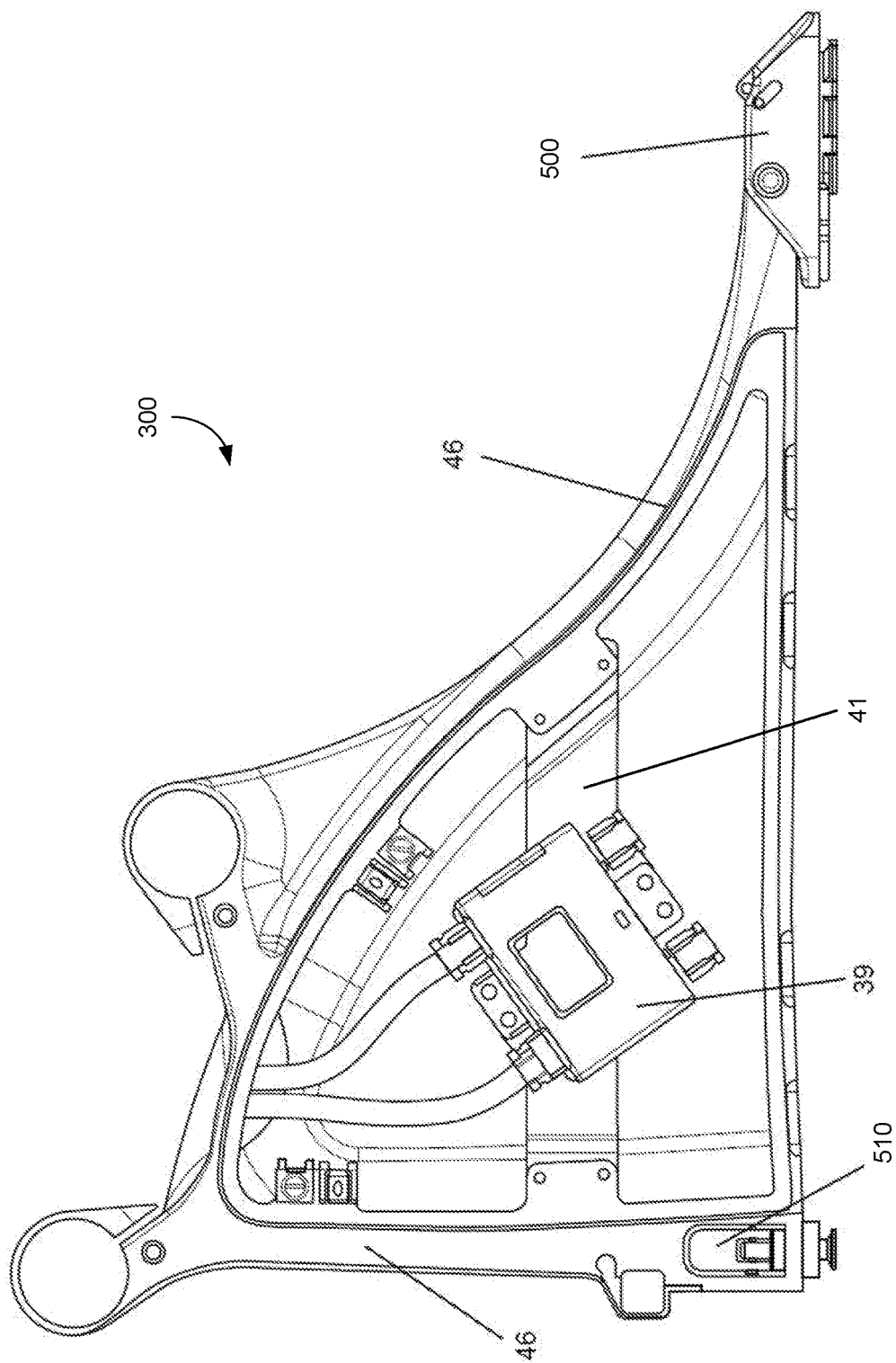
FIG. 3 is a perspective view of an example aircraft passenger seat base frame with a seat electronics box positioned inside the one of the leg assemblies according to one or more aspects of the disclosed subject matter.

In some implementations, the panel 52 (e.g., leg shroud) may provide a mask for hiding an electronics box therein. FIG. 3 is a perspective view of a seat base frame 300 with a seat electronics box 39 positioned inside the one of the leg assemblies 32. The seat electronics box 39, for example, can route electricity to any electronics components associated with seat operation (e.g., audio jack, volume, changing a channel, seat adjustment, etc.). Further, the seat electronics box 39 can route electricity to one or more passenger-accessible charging outlets, such as an A/C outlet, a USB outlet, a micro-USB outlet, an iPhone® Lightning outlet, or a wireless charging outlet. The leg assembly 46 housing the seat electronics box 39 can hide the seat electronics box 39 such that the seat electronics box 39 is not blocking other components that may be accessed more frequently, such as the IFE components 38, for example. The leg assembly 46 can also provide protection for the seat electronics box 39 by preventing load and impact from passenger luggage being stored under the seat base frame or passenger feet being extended under the seat base frame. For example, as illustrated, a transverse beam 41 across the leg assembly 46 is positioned to protect the electronics box 39 from impact due to under-seat luggage.

Figure 2:
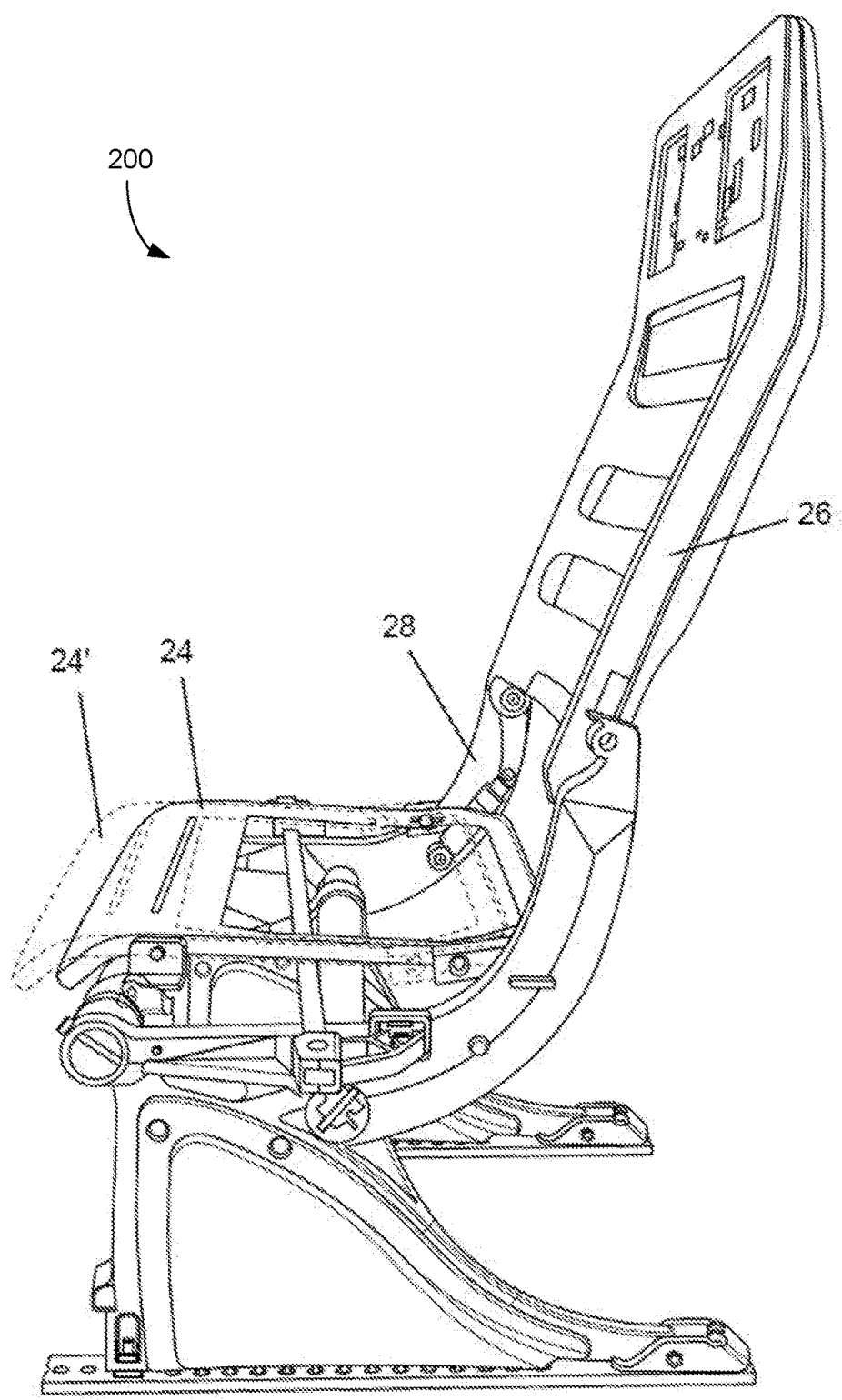
FIG. 2 is a perspective view of an example aircraft passenger seat base frame depicting translating movement of the seat bottom according to one or more aspects of the disclosed subject matter.

FIG. 2 is a perspective view of the seat base frame 200 depicting translating movement of the seat bottom 24 in a first position and the seat bottom 24' in a second position, the second position corresponding to the translated position. The translated position corresponding to seat bottom 24' is translated a predetermined amount forward from the first position of the seat bottom 24. The translated position of the seat bottom 24' can be a range of positions forward of the first position of the seat bottom 24 based on how far the seat back 26 is being reclined. Seat translation, for example, can provide recline opportunity for the passenger without infringing upon a space of the aft-positioned passenger seat (e.g., without displacing a position of a tray table provided for the use of the aft-seated passenger).

In translating the seat pan, in some embodiments, because the IFE components 38, the protective member 40, and the seat bottom are integral in translation, the entire structure moves as a single unit. As illustrated in FIG. 1, in some implementations, seat pan translation may be limited to a range in which the protective member 40 avoids interference with the structural members 34 and 36. For example, the protective member 40 may be dimensioned to meet the forward structural member 34 in forward translation at a vertical end surrounding the IFE components 38, and to meet the rear structure member 36 at the cable feed channel 53.

Figure 6:
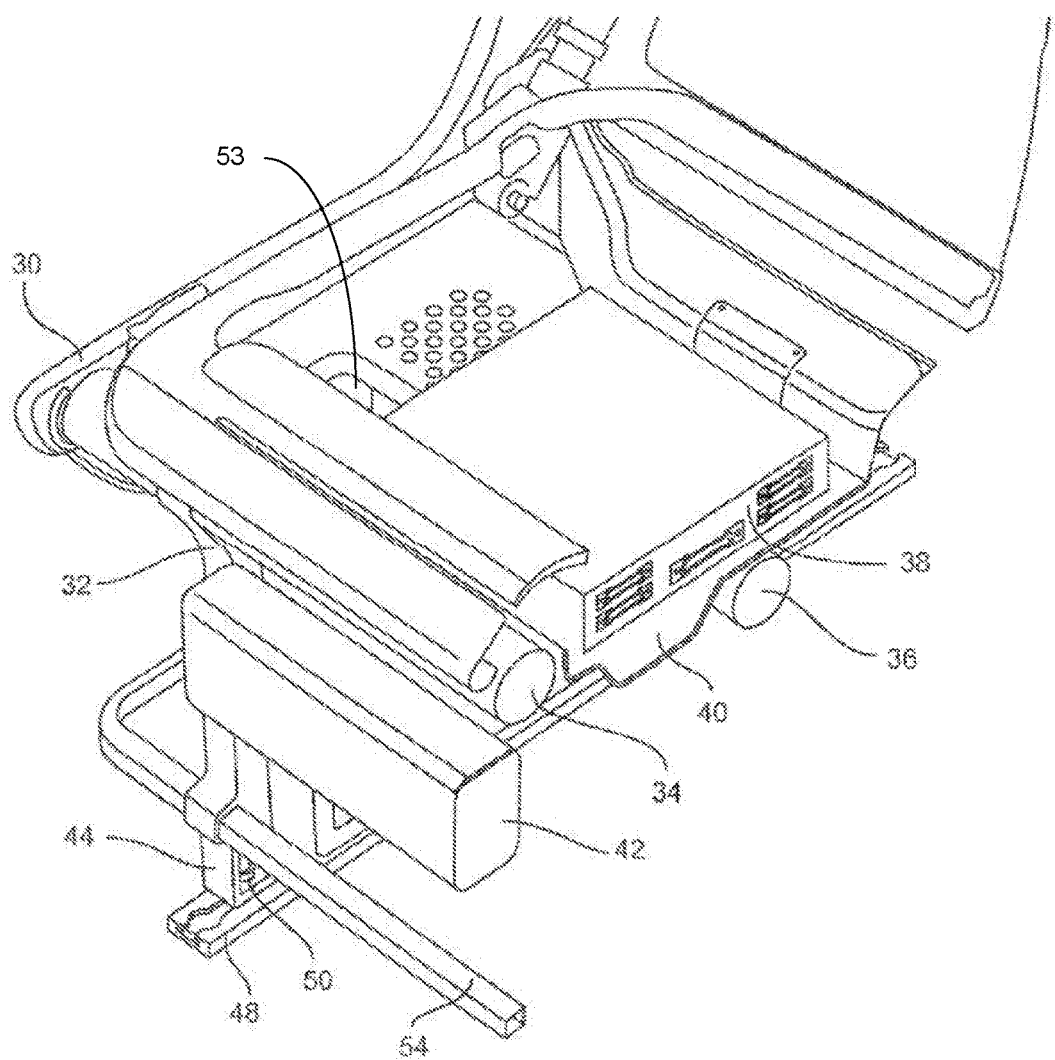
FIG. 6 is a top perspective view of an example aircraft passenger seat base frame according to one or more aspects of the disclosed subject matter.

FIGS. 4 and 6 are perspective views of the seat base frame 20 showing the location of the IFE components 38 that allow the components to be packaged in areas that do not detriment or cannibalize passenger living space, as well as hide associated parts (e.g., fasteners, wire harness, etc.) from view and prevent access by the passengers. Additionally, the front structural member 34 assists in protecting the IFE components 38 from load and impact. Also, locating the IFE components 38 in an area that does not vary between various primary seat base frame configurations, such as track spacing, obviates the need for a multitude of unique parts, and protective members, fastening points and other related parts can be made common across all configurations.

As illustrated in FIG. 4, the IFE components 38 can also provide a feed for one or more electrical charging outlets 45 extending to the rear of the seat base frame 20. The charging outlets 45, in some examples, can include an AC outlet, a USB outlet, an iPhone Lightning outlet, and/or a micro-USB outlet to provide access to passengers in an aft-positioned passenger seat behind the seat base frame 20 to plug in various electronic devices. The electronics box 39, for example, may route electricity through the cabling channel 53 of the protective member 40 to the charging outlets 45. In other implementations, the electronics box 39 may route electricity to one or more charging outlets mounted on an arm rest of the passenger seat (not illustrated). Electrical connection feeds 47 may also be available as electrical connections for feeding outlets such as A/C, USB, micro-USB, an iPhone Lightning outlet, etc.

As shown in FIGS. 4 and 6, a luggage retention bar 54 extends from a side of the seat base frame 20 and across the front legs 44 at a height elevated off of the underlying floor to retain luggage stowed beneath the seat by an aft-seated passenger from sliding forward into the foot space of the seated passenger. The luggage retention bar 54 may extend across the front of one single seat or across the front of an entire row of seats. The luggage retention bar 54 as shown is secured to the front of the front legs 44.

Figure 8:
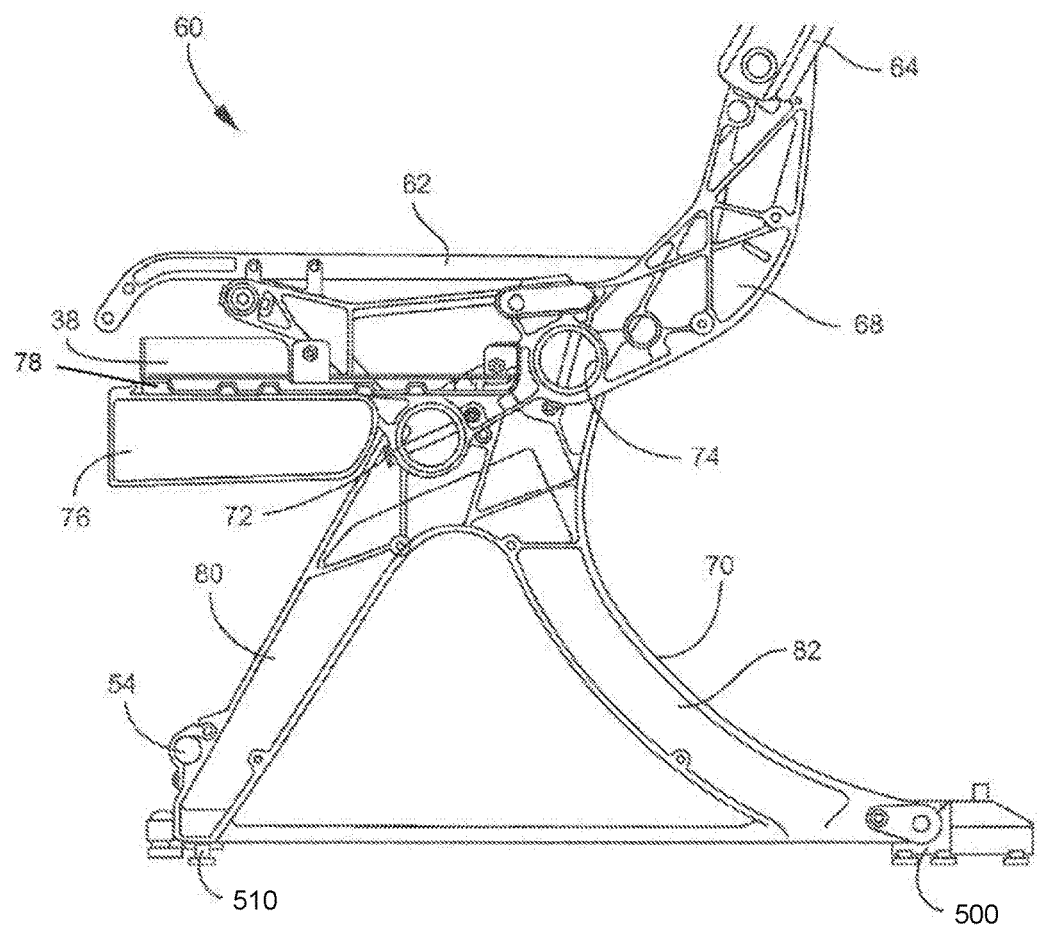
FIG. 8 is a side view of an example aircraft passenger seat base frame according to one or more aspects of the disclosed subject matter.
Figure 9:
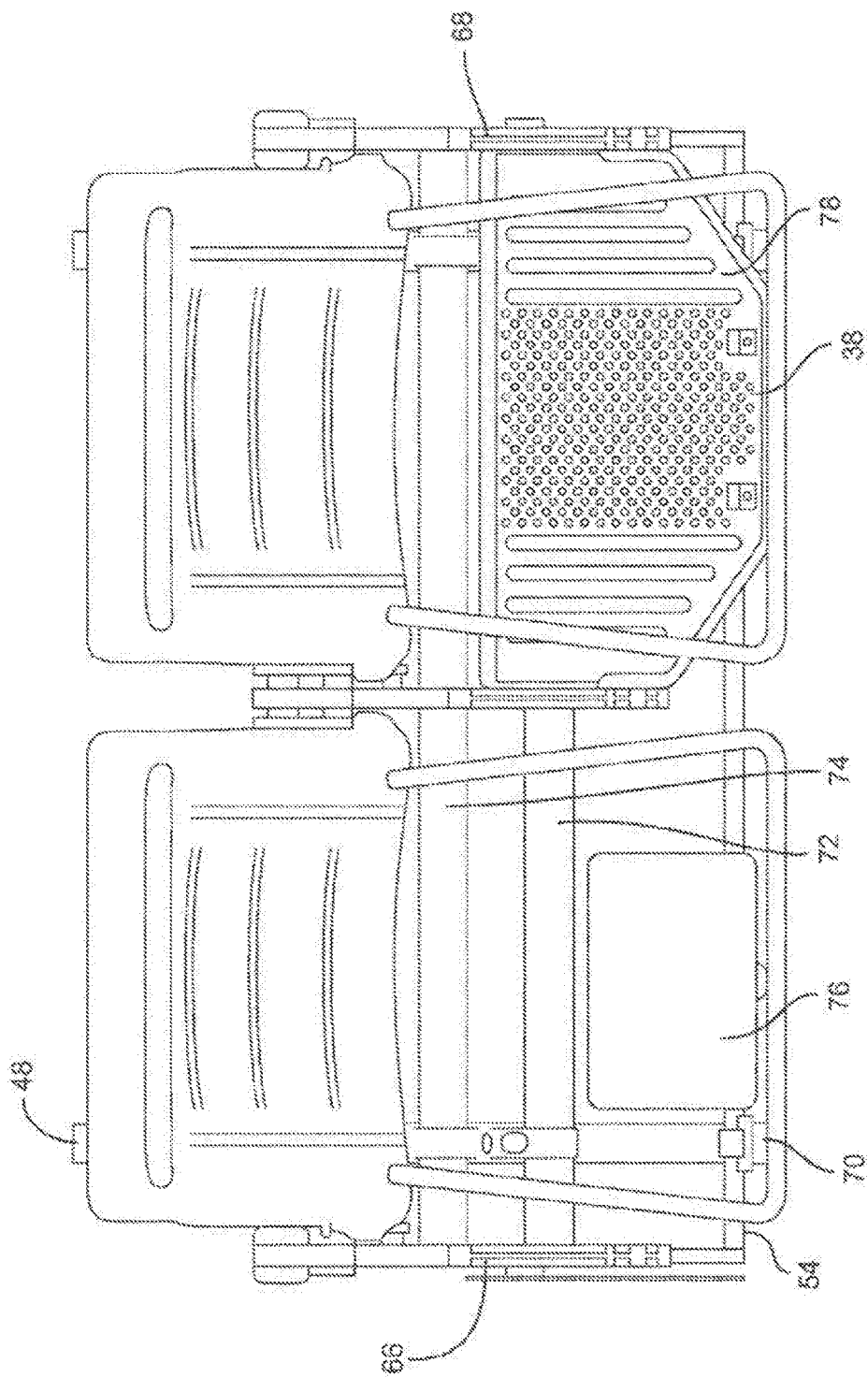
FIG. 9 is a top view of laterally adjacent aircraft passenger seat base frames according to one or more aspects of the disclosed subject matter.

Referring to FIG. 8 and FIG. 9, a second embodiment of an aircraft passenger seat base frame is shown generally at reference numeral 60. The seat base frame 60 may also include a single seat, or two or more laterally adjacent seats collectively forming a row. Each seat within the same row generally includes a seat bottom 62 and seatback 64 cooperatively supported on and between spaced left and right spreaders 66, 68. The left and right spreaders 66, 68, positioned on opposite sides of the seat bottom 62, are supported above the floor by spaced left and right leg assemblies 70. The left and right spreaders 66, 68 and leg assemblies 70 are interconnected through front and rear transverse structural members 72, 74.

The left and right spreaders 66, 68 and front and rear structural members 72, 74 are the primary supportive frame members of the seat base frame 60. The front structural member 72 according to the second embodiment is positioned vertically below the seat bottom 62 about half-way along the length thereof, while the rear structural member 74 is positioned proximate the back end of the seat bottom and a vertical height above the front structural member 72. In this arrangement, a space is provided forward of the rear structural member 74 and vertically above the front structural member 72 for locating the inflight entertainment (IFE) components 38. This space dedicated for the IFE components 38 is protected from the top by the seat bottom 62, the back by the rear structural member 74, and the bottom by the front structural member 72 as well as a life vest container 76. Again, the space is apart from and protected from passenger living space and under seat luggage storage.

The life vest container 76 is located vertically below the IFE components 38 at the forward end of the seat bottom 62, providing ready and convenient access thereto in the event of an emergency requiring use of a life vest. The life vest container 76 can have a different configuration than life vest container 42, and may open from the front to access the interior. For example, the life vest container 42 may be a soft-sided pouch, while the life vest container 76 is a rigid structure to provide impact protection to the IFE components 38. Further, the lift vest container 76 may provide load-sharing with the IFE components 38. For example, the life vest container 76 may attach directly to the underside of the IFE components 38. In another example, a protective member 78 (e.g., shroud) may be disposed between the IFE components 38 and the life vest container 76. The protective member 78, for example, may be designed similarly to the protective member 40, discussed above.

The left and right leg assemblies 70, in some implementations, each include a front leg 80 and a rear leg 82 configured to attach to an underlying seat track 48 in the floor by way of tool-less quick release track fasteners 50, 51 as described herein. The front leg 80 as shown extends forward at an angle to vertical, and particularly from below the front structural member 72 to a position on the seat track 48 forward of the front structural member. The rear leg 82 is curved and extends from vertically below the rear structural member 74 to a position on the seat track 48 behind the rear structural member. The space formed between the front and rear legs may be covered with a panel to divide footwells and/or prevent luggage stowed beneath the seat from moving into the aisle. In some implementations, the panel masks and protects a seat electronics box 39, as discussed in relation to FIG. 3.

FIG. 9 shows laterally adjacent seats in the same row sharing frame components and the locations of the IFE components 38 and life vest container 76. A luggage retention bar 54 extends from a side of the seat base frame 60 and across the front of the front legs 80 at a height elevated from the underlying floor to retain luggage stowed beneath the seat by an aft-seated passenger from sliding forward into the foot space of the seated passenger.

A passenger seat base frame such as seat base frame 20 of FIG. 1 and 200 of FIG. 2 or the passenger seat base frame 60 of FIGS. 8 and 9, in some implementations, includes tool-less quick release track fittings 500, 510. The track fittings 500, 510 are operable without an Allen wrench, for example. The track fittings 500, 510 operate via a release mechanism. The track fitting 510 attached to the front leg 44 can be oriented such that the release mechanism flips side-to-side rather than fore-aft, such as the track fitting 500 connected to the rear leg 46. Additionally, having each track fitting be a tool-less quick release track fitting (rather than only the front track fitting 510 be a tool-less quick release track fitting, for example) further reduces the need for tools.

Figure 5A:
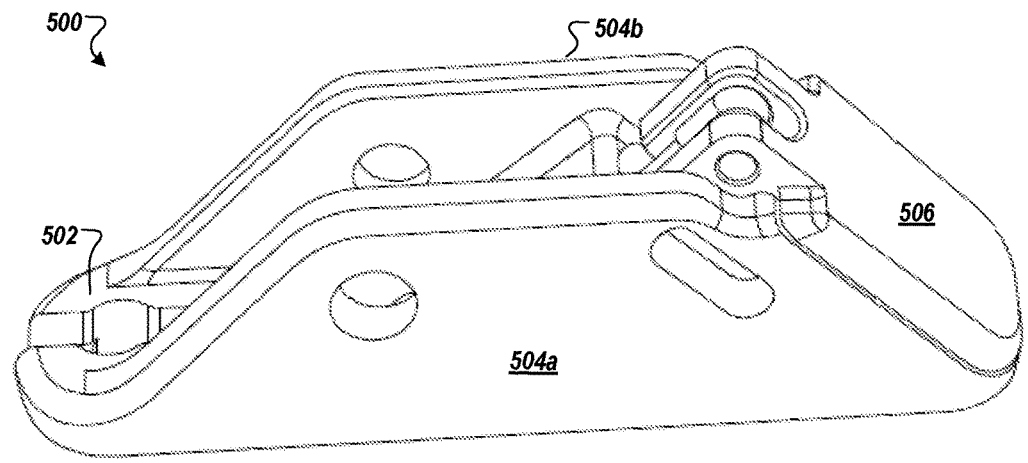
FIG. 5A is a perspective view of an example rear tool-less quick release track fitting according to one or more aspects of the disclosed subject matter.

FIG. 5A is a perspective view of a rear tool-less quick release track fitting 500. The rear track fitting 500 can be attached to the rear leg 46, for example (see FIG. 3). The rear track fitting 500 includes a foot portion 502 including a number of openings for aligning with a seat track on the cabin floor of an airplane. The rear leg 46, for example, drops between a pair of sidewalls 504 of the rear track fitting 500 while a rear fore-aft latching mechanism 506 is positioned within an open (unlocked) configuration, To complete installation, the locking mechanism 506 is toggled to a closed position (as illustrated). In some embodiments, a latch secures the locking mechanism 506 in its closed position. For example, a latch may be used to avoid manipulation of the locking mechanism 506 by a passenger. The rear track fitting 500, for example, is useful in quickly shifting seating configuration in an aircraft cabin, for example based upon sales of different classes of passenger seats for a given day (week, etc.).

Figure 5B:
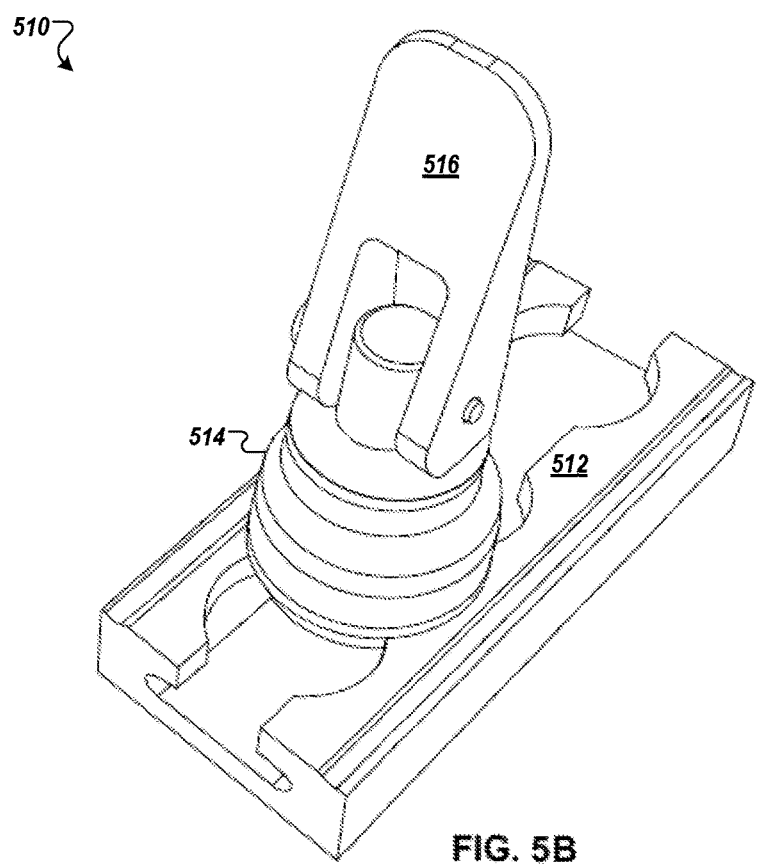
FIG. 5B is a perspective view of an example front tool-less quick release track fitting according to one or more aspects of the disclosed subject matter.

FIG. 5B is a perspective view of a front tool-less quick release track fitting 510. The front track fitting 510 can be attached to the front leg 44 (see FIG. 3). The front track fitting 510, for example, may be a cam clamp configured for installation upon a seat track on the cabin floor of an airplane such that a mounting block 512 of the front rack fitting 510 is perpendicular to the seat track. A mounting pin 514 portion of the front track fitting 510 is configured to selectively slide within the mounting block 512 to select an appropriate seat pitch. In this configuration, for example, economy class seating may be swapped for business class seating, and vice-versa, while utilizing a same position and seat track width. The mounting pin 514, for example, may release from the mounting block 512 such that the mounting pin 514 may be mated through an opening in the front seat leg 44 and latched to the mounting block 512 by toggling a mounting clamp 516.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the disclosed subject matter to produce additional embodiments. Furthermore, certain features may sometimes be used to advantage without a corresponding use of other features. Accordingly, it is intended that the teachings of the present disclosure embrace all such alternatives, modifications, equivalents, and variations that are within the spirit and scope of the disclosed subject matter.

The invention claimed is:

1. An aircraft passenger seat base frame, comprising:
spaced left and right spreaders supporting a seat pan and a seatback;
a front transverse structural member and a rear transverse structural member each disposed below the seat pan and each interconnecting the left and right spreaders;
an in-flight entertainment component compartment defined between the seat pan and at least one of the front transverse structural member and the rear transverse structural member enclosing an in-flight entertainment component; and
a protective member disposed vertically below the in-flight entertainment component and above at least one of the front transverse structural member and the rear transverse structural member; wherein
the front transverse structural member is vertically aligned with at least a portion of the in-flight entertainment component, and
the rear transverse structural member is horizontally aligned with at least a portion of the in-flight entertainment component.

2. The aircraft passenger seat base frame of claim 1, wherein the in-flight entertainment component includes one or more of video equipment, media equipment, internet equipment, communications equipment, and audio equipment, cabling, and a wire harness.

3. The aircraft passenger seat base frame of claim 1, wherein the protective member is configured to structurally support the in-flight entertainment component.

4. The aircraft passenger seat base frame of claim 1, further comprising:
left and right leg assemblies; and
a seat electronics box disposed against one of the left and right leg assemblies, wherein the seat electronics box is configured to supply electricity to the in-flight entertainment component.

5. The aircraft passenger seat base frame of claim 4, wherein at least one of the left and right leg assemblies comprises a shroud and a transverse beam, wherein the seat electronics box is disposed between the transverse beam and the shroud.

6. The aircraft passenger seat base frame of claim 4, further comprising at least one electrical connection disposed through a rear section of one of the seat pan and the seat back, wherein at least one aft-facing electrical outlet connected to the at least one electrical connection is disposed on an aft surface of one of a seat bottom and the seat back, and wherein the seat electronics box supplies electricity to the at least one electrical connection.

7. The aircraft passenger seat base frame of claim 6, wherein the at least one electrical outlet comprises a micro-USB charging outlet.

8. An aircraft passenger seating group, comprising:
first and second laterally-adjacent passenger seat frames, wherein each laterally-adjacent passenger seat frame comprises
spaced left and right spreaders supporting a seat pan and a seatback,
a seat bottom, and
a protective member disposed below the respective seat bottom of each laterally-adjacent passenger seat frame, wherein the protective member is configured to retain an in-flight entertainment component, each protective member including a respective laterally-extending channel, wherein the laterally-extending channel of the protective member of the first laterally-adjacent passenger seat frame aligns with the laterally-extending channel of the protective member of the second laterally-adjacent passenger seat frame; and
a front transverse structural member and a rear transverse structural member each interconnecting the left and right spreaders, wherein
one of the front transverse structural member and the rear transverse structural member is positioned below the in-flight entertainment component, and
the other of the front transverse structural member and the rear transverse structural member is positioned in a horizontal plane with the in-flight entertainment component;

wherein in-flight entertainment signals are made available from an in-flight entertainment component retained by the protective member of the first laterally-adjacent passenger seat frame to the second laterally-adjacent passenger seat frame by arranging cabling from the in-flight entertainment component through the channel of the protective member of the first laterally-adjacent passenger seat frame to the channel of the protective member of the second laterally-adjacent passenger seat frame.

9. The aircraft passenger seating group of claim 8, wherein:
the front transverse structural member is positioned for aligning in a vertical plane with at least a portion of the in-flight entertainment component, and
the rear transverse structural member is positioned for aligning in a horizontal plane with at least a portion of the in-flight entertainment component.

10. The aircraft passenger seating group of claim 9, wherein the channel of each of the protective members of the laterally-adjacent passenger seat frames is disposed in front of the rear transverse structural member and beneath the front transverse structural member.

11. The aircraft passenger seating group of claim 8, wherein each of the protective members of the laterally-adjacent passenger seat frames comprises a plurality of openings to provide air flow to the in-flight entertainment component.

12. The aircraft passenger seating group of claim 8, wherein each of the protective members of the laterally-adjacent passenger seat frames forms a bottom of the seat pan of the respective laterally-adjacent passenger seat frame.

13. The aircraft passenger seating group of claim 8, wherein each seat bottom of the laterally-adjacent passenger seat frames forms a respective lid for providing access to the in-flight entertainment component.

14. An aircraft passenger seat base frame, comprising:
a seatback configured for actuation between a reclined position and an upright position;
a seat bottom configured for actuation between a fore position corresponding to the reclined position of the seatback and an aft position corresponding to the upright position of the seatback;
a seat pan disposed beneath the seat bottom;
spaced left and right spreaders supporting the seat pan and the seatback;
an in-flight entertainment component positioned in the seat pan; and
a front transverse structural member and a rear transverse structural member each interconnecting the left and right spreaders, wherein
one of the front transverse structural member and the rear transverse structural member is positioned below the in-flight entertainment component; and
the other of the front transverse structural member and the rear transverse structural member is horizontally aligned with the in-flight entertainment component.

15. The aircraft passenger seat base frame of claim 14, further comprising a rigid life vest container disposed beneath the in-flight entertainment component.

16. The aircraft passenger seat base frame of claim 14, further comprising a protective member positioned vertically below the in-flight entertainment component.

17. The aircraft passenger seat base frame of claim 14, wherein the seat bottom is disposed above the in-flight entertainment component, and wherein at least a one inch gap exists between the in-flight entertainment component and the seat bottom.

18. The aircraft passenger seat base frame of claim 17, wherein the seat bottom is configured to hingedly open, exposing the in-flight entertainment component.

* * * * *